(12) United States Patent
Fukuda et al.

(10) Patent No.: US 10,777,989 B2
(45) Date of Patent: Sep. 15, 2020

(54) WATERPROOFING STRUCTURE FOR CORE WIRE EXPOSED PORTION OF ELECTRICAL WIRE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Takao Fukuda, Mie (JP); Takashi Takada, Mie (JP); Kenji Ito, Mie (JP); Yusaku Maeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/439,813

(22) Filed: Jun. 13, 2019

(65) Prior Publication Data
US 2019/0386477 A1    Dec. 19, 2019

(30) Foreign Application Priority Data
Jun. 14, 2018 (JP) .................................. 2018-113759

(51) Int. Cl.
*H01R 4/22* (2006.01)
*H02G 15/04* (2006.01)
*H01R 13/52* (2006.01)

(52) U.S. Cl.
CPC ............ *H02G 15/043* (2013.01); *H01R 4/22* (2013.01); *H01R 13/52* (2013.01); *H01R 13/5205* (2013.01); *H01R 13/5216* (2013.01)

(58) Field of Classification Search
CPC .... H02G 15/043; H01R 4/22; H01R 13/5205; H01R 13/5216; H01R 13/52; H01R 43/20
USPC ........................................................ 174/74 A
See application file for complete search history.

(56) References Cited

U.S. PATENT DOCUMENTS

| 2,701,273 | A | * | 2/1955 | Badeau | ................... | H01R 4/22 |
| | | | | | | 174/138 F |
| 5,099,089 | A | * | 3/1992 | Zan | ......................... | H01R 4/22 |
| | | | | | | 174/84 S |
| 5,622,642 | A | * | 4/1997 | Edwards | .............. | H02G 15/043 |
| | | | | | | 219/542 |
| 6,359,226 | B1 | * | 3/2002 | Biddell | .................... | H01R 4/22 |
| | | | | | | 174/74 A |

(Continued)

FOREIGN PATENT DOCUMENTS

JP         10-083845 A         3/1998

OTHER PUBLICATIONS

International Search Report dated Dec. 19, 2017 for WO 2018/101056 A1.

*Primary Examiner* — Steven T Sawyer
(74) *Attorney, Agent, or Firm* — Abelman, Frayne & Schwab

(57) ABSTRACT

A waterproofing structure 20 for a core wire exposed portion of an electrical wire includes: an electrical wire 10 that includes a core wire exposed portions 12a; an internal waterproofing portion 21 that encloses the core wire exposed portion 12a to waterproof the core wire exposed portion 12a; and an exterior member 30 that forms a space S that is separated from an external space, around the internal waterproofing portion 21.

9 Claims, 7 Drawing Sheets

(56) References Cited

U.S. PATENT DOCUMENTS

| | | | |
|---|---|---|---|
| 9,917,393 B1* | 3/2018 | King, Jr. ................ | H01R 13/52 |
| 2006/0048965 A1* | 3/2006 | Ootsuki .................. | H01R 4/22 |
| | | | 174/74 A |

* cited by examiner

WATERPROOFING STRUCTURE FOR CORE WIRE EXPOSED PORTION OF ELECTRICAL WIRE

CROSS-REFERENCE TO RELATED APPLICATIONS

This application is based on and claims priority from Japanese Patent Application No. 2018-113759, filed on Jun. 14, 2018, with the Japan Patent Office, the disclosure of which is incorporated herein in their entireties by reference.

TECHNICAL FIELD

The present invention relates to technique for waterproofing core wire exposed portions of electrical wires in vehicles, ships, aircrafts, mechanical devices, and so on.

BACKGROUND

Japanese Patent Laid-open Publication No. 10-083845 discloses a protection cap that is made of resin, that has a cylindrical shape with one closed end and one open end, into which a terminal consolidation splice portion is inserted, and that is filled with sealant. According to Japanese Patent Laid-open Publication No. 10-083845, a small diameter portion is provided in an opening side of the protection cap, and an enlarged diameter portion is provided at an intermediate position in the axial direction, where the liquid surface of the sealant is to be located. In a state where the terminal consolidation splice portion and electrical wires, which are inserted into the protection cap, are in contact with the inner circumferential surface of the small diameter portion on the opening side, there is a required gap from the inner circumferential surface of the enlarged diameter portion at the intermediate position.

SUMMARY

In an excessively cold or hot environment, cracking may occur in a cured sealant in the protection cap.

Therefore, the present invention aims to prevent cracking from occurring in an internal waterproof portion, even under an excessively cold or hot environment, or the like.

To solve the above-described problem, a waterproofing structure for a core wire exposed portion of an electrical wire according to a first aspect includes: an electrical wire that includes a core wire exposed portion; an internal waterproofing member that encloses the core wire exposed portion to waterproof the core wire exposed portion; and an exterior member that forms a space that is separated from an external space, around the internal waterproofing portion.

A second aspect is a the waterproofing structure for a core wire exposed portion of an electrical wire according to the first aspect, wherein the exterior member encloses an outer circumferential surface of the internal waterproofing portion with a gap from the outer circumferential surface, to form a tubular space on the outer circumference side of the internal waterproofing portion.

A third aspect is the waterproofing structure for a core wire exposed portion of an electrical wire according to the second aspect, wherein the space includes a portion where an interval is greater than or equal to 1 mm.

A fourth aspect is the waterproofing structure for a core wire exposed portion of an electrical wire according to any one of the first to the third aspects, wherein the exterior member has a thickness greater than or equal to 1 mm.

A fifth aspect is the waterproofing structure for a core wire exposed portion of an electrical wire according to any one of the first to the fourth aspects, wherein the exterior member is made of at least one of an elastomer, a thermoplastic resin, and a thermosetting resin.

A sixth aspect is the waterproofing structure for a core wire exposed portion of an electrical wire according to any one of the first to fourth aspects, wherein the exterior member is made of metal.

A seventh aspect is the waterproofing structure for a core wire exposed portion of an electrical wire according to any one of the first to the sixth aspects, wherein the core wire exposed portion is provided at an end of the electrical wire, and the internal waterproofing portion includes an internal cap that houses the core wire exposed portion, and a water-blocking agent that has been filled into the internal cap and has been cured.

An eighth aspect is the waterproofing structure for a core wire exposed portion of an electrical wire according to the seventh aspect, wherein a cured liquid surface of the water-blocking agent is located on the bottom side relative to an opening edge of the internal cap.

A ninth aspect is the waterproofing structure for a core wire exposed portion of an electrical wire according to the seventh or the eighth aspect, wherein the exterior member includes an external cap that encloses an outer circumferential surface of the internal cap with a gap from the outer circumferential surface.

A tenth aspect is the waterproofing structure for a core wire exposed portion of an electrical wire according to the ninth aspect, wherein an opening side end portion of the external cap includes a portion that has an inner diameter smaller than an inner diameter of a portion that encloses the core wire exposed portion.

An eleventh aspect is the waterproofing structure for a core wire exposed portion of an electrical wire according to the tenth aspect, wherein the opening side end portion of the external cap has a shape that includes a plurality of ring-shaped protrusions that protrude toward the inner circumference side.

A twelfth aspect is the waterproofing structure for a core wire exposed portion of an electrical wire according to any one of the first to the eleventh aspects, wherein an opening edge of the external cap is aligned with an opening edge of the internal cap.

According to the first aspect, due to the exterior member, a space that is separated from the external space is formed around the internal waterproofing portion. Therefore, changes in the ambient temperature are less likely to be transferred to the internal waterproofing portion, and it is possible to prevent cracking from occurring in the internal waterproof portion, even under an excessively cold or hot environment, or the like.

According to the second aspect, regarding the entire circumference of the internal waterproofing portion, external heat is less likely to be transferred to the internal waterproofing portion, and cracking can be effectively prevented from occurring in the internal waterproofing portion.

According to the third aspect, a space that includes a portion where an interval is greater than or equal to 1 mm is formed around the internal waterproofing portion. Therefore, changes in the ambient temperature are even less likely to be transferred to the internal waterproofing portion, and it is possible to further prevent cracking from occurring in the internal waterproof portion.

According to the fourth aspect, the exterior member is less likely to deform, and the thickness of the space is likely to be maintained.

According to the fifth aspect, the exterior member can be easily formed.

According to the sixth aspect, radiant heat is likely to be reflected, and changes in temperature due to radiant heat can be suppressed.

According to the seventh aspect, it is possible to waterproof the core wire exposed portion at the end of the electrical wire, using the internal cap and the water-blocking agent that has been filled into the internal cap and has been cured.

According to the eighth aspect, space can be easily secured above the cured liquid surface in the internal cap.

According to the ninth aspect, it is possible to form space around the internal cap by enclosing the outer circumferential surface of the internal cap with the external cap, with a gap from the outer circumferential surface.

According to the tenth aspect, the opening side end portion of the external cap includes a portion that has an inner diameter smaller than the inner diameter of a portion enclosing the core wire exposed portion. Therefore, it is easier to secure space around the core wire exposed portion.

According to the eleventh aspect, spaces can be formed between the plurality of ring-shaped protrusions, and due to the presence of the spaces, external heat is less likely to be transferred to the core wire exposed portion.

According to the twelfth aspect, the opening edge of the external cap is aligned with the opening edge of the internal cap. Therefore, it is easier to secure space on the leading end side of the internal cap.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Figure 1:
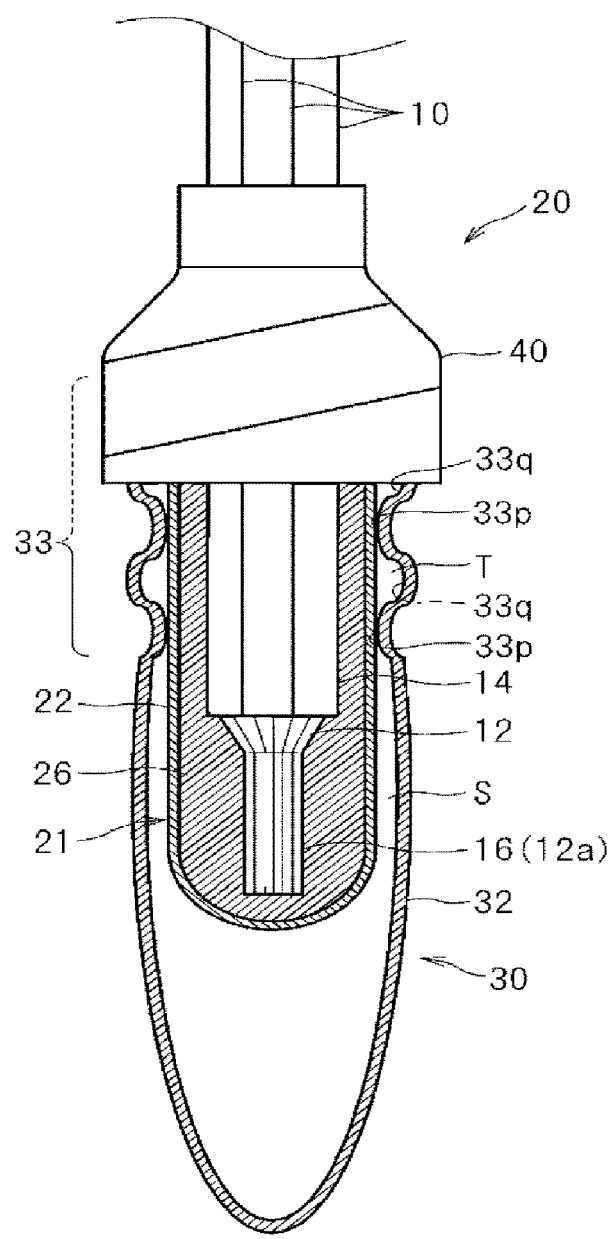
FIG. 1 is a partial cross-sectional view showing a waterproofing structure for core wire exposed portions of electrical wires according to an embodiment.
Figure 2:
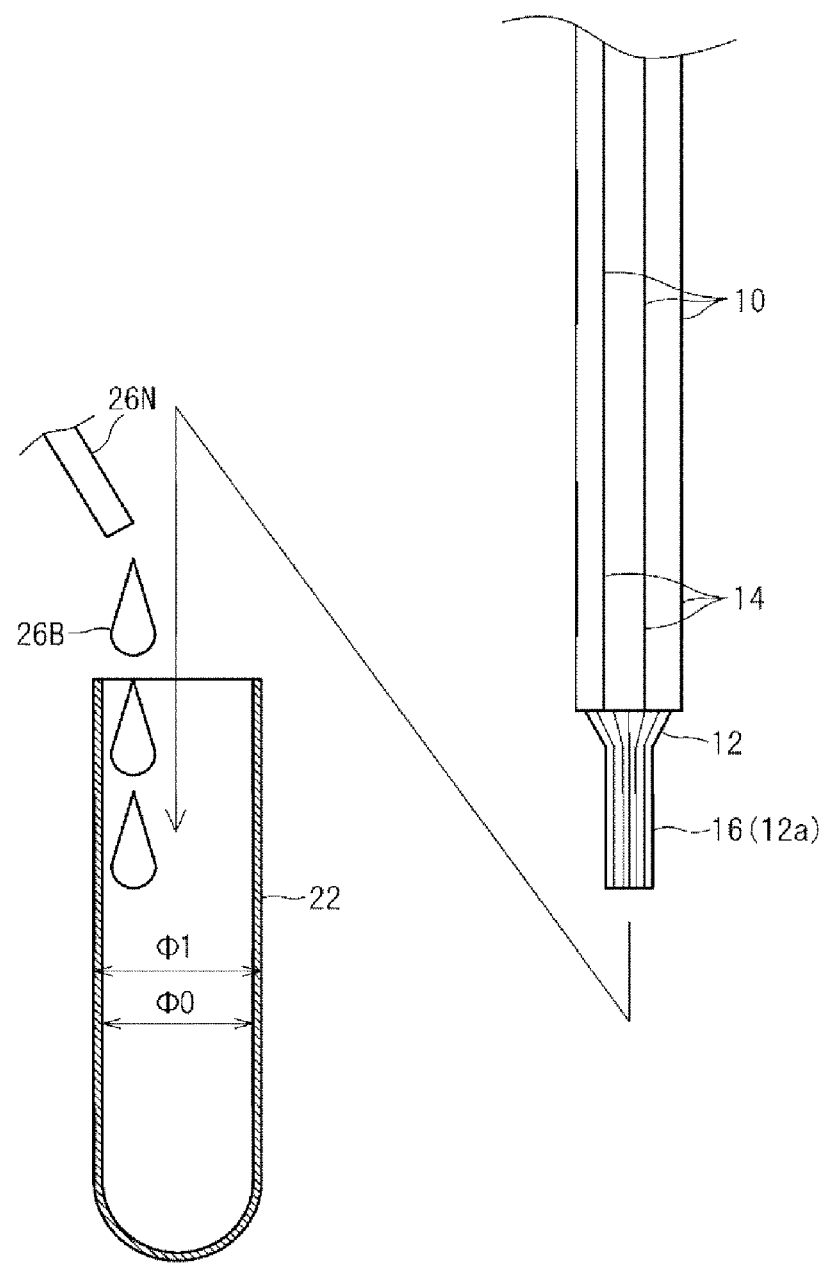
FIG. 2 illustrates an example of a method for manufacturing the waterproofing structure for core wire exposed portions of electrical wires.
Figure 3:
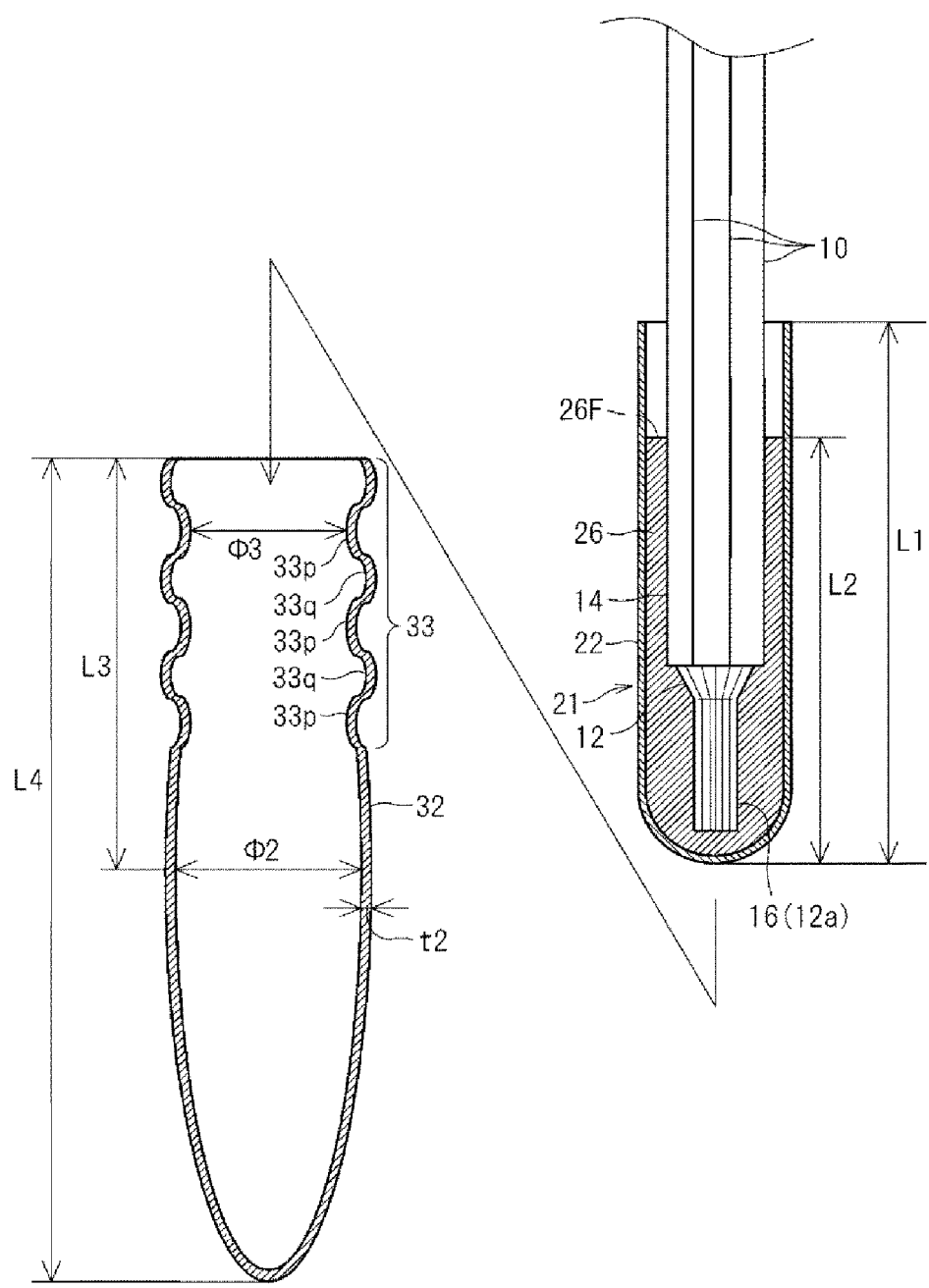
FIG. 3 illustrates the example of the method for manufacturing the waterproofing structure for core wire exposed portions of electrical wires.
Figure 4:
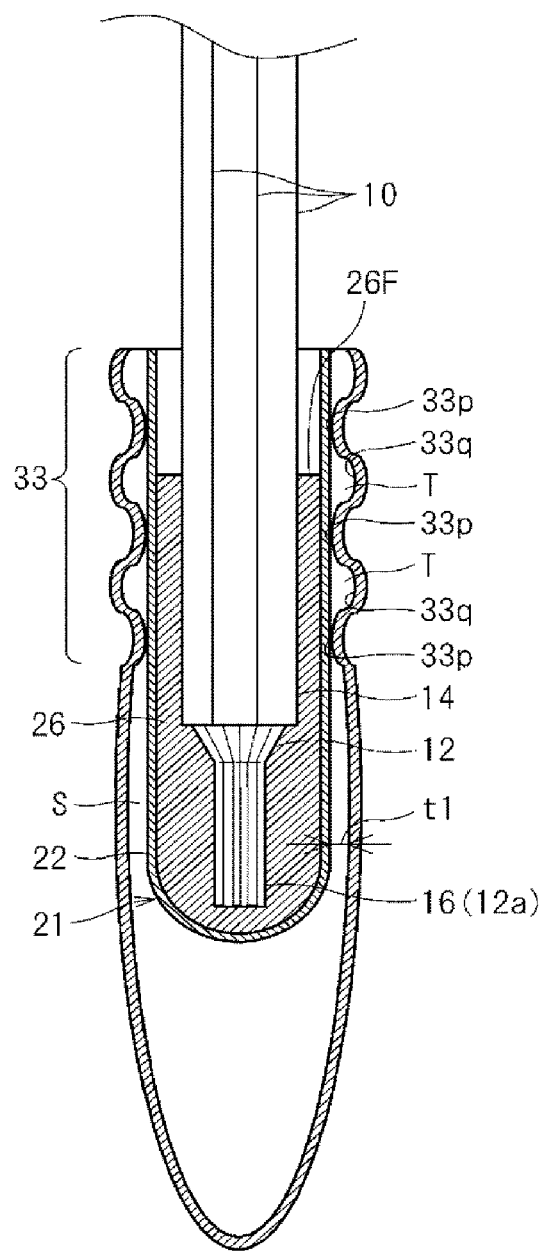
FIG. 4 illustrates the example of the method for manufacturing the waterproofing structure for core wire exposed portions of electrical wires.

The following describes a waterproofing structure for core wire exposed portions of electrical wires according to an embodiment. FIG. 1 is a partial cross-sectional view showing a waterproofing structure 20 for core wire exposed portions of electrical wires according to the embodiment. FIGS. 2 to 4 illustrate an example of the method for manufacturing the waterproofing structure 20 for core wire exposed portions of electrical wires.

The waterproofing structure 20 for core wire exposed portions of electrical wires includes electrical wires 10, an internal waterproofing portion 21, and an exterior member 30.

In this example, the waterproofing structure 20 includes a plurality of electrical wires 10. The electrical wires 10 each include a core wire 12 and a coating 14.

The core wire 12 is formed of a conductive material such as copper, a copper alloy, aluminum, an aluminum alloy, or the like. The core wire 12 is constituted by one or more strands. When a plurality of electrical wires 10 are provided, the core wires 12 of the plurality of electrical wires 10 may be of the same type or different types.

The coating 14 is formed by, for example, extrusion-molding an insulating material such as resin around the core wire 12.

The electrical wires 10 each include a core wire exposed portion 12a. In this example, the coating 14 at an end of an electrical wire 10 is removed, and thus the core wire exposed portion 12a where the core wire 12 is exposed is formed at the end of the electrical wire 10.

The core wire exposed portions 12a at the ends of the plurality of electrical wires 10 are joined to each other, and thus a junction portion 16 is formed. The core wire exposed portions 12a are joined to each other through welding such as resistance welding or ultrasonic welding, pressure-bonding using terminals, soldering, or the like.

The internal waterproofing portion 21 is a portion that is provided so as to enclose the above-described core wire exposed portions 12a to waterproof the core wire exposed portions 12a.

In this example, the internal waterproofing portion 21 includes an internal cap 22 and a water-blocking agent 26.

The internal cap 22 is a tubular member with one end open and the other end closed. The inner diameter $\varphi 0$ of the internal cap 22 is set such that the internal cap 22 can house a core wire exposed portion 12a at an end of an electrical wire 10, which is, in this example, the junction portion 16 of the core wire exposed portions 12a of a plurality of electrical wires 10, and a gap can be provided between the entire circumference of the junction portion 16 and the internal cap 22 in a state where the junction portion 16 is housed.

More specifically, a portion from one end to an intermediate portion of the internal cap 22 in an extending direction in which the internal cap 22 extends has a tubular shape with a constant diameter. The other end of the internal cap 22 has a hemispherical shape that bulges outward. The inner diameter $\varphi 0$ of one end and the intermediate portion of the internal cap 22 in the extending direction is set to be greater than the outer diameter of the electrical wires 10, which is, in this example, the diameter of a circle circumscribing the bundled portions of a plurality of electrical wires 10. A length L1 of the internal cap 22 is set to be greater than the length of the above-described junction portion 16 and the core wire exposed portions 12*a*.

When the portion where the plurality of electrical wires 10 are bundled and the junction portion 16 can be housed in the internal cap 22, and also, in the housed state, the entire circumference of the junction portion 16 and the plurality of electrical wires 10 can be separated from the inner circumferential surface of the internal cap 22.

The internal cap 22 may be formed through dip molding or injection molding.

The internal cap 22 does not necessarily have the above-described shape. The internal cap may have a spindle shape that is thickest at the intermediate portion in the extending direction. Also, the intermediate portion of the internal cap in the extending direction does not necessarily have a cylindrical shape, and may have an elliptic tube shape, or a polygonal tube shape such as a triangular tube shape or a square tube shape.

The internal cap 22 is made of at least one of an elastomer, a thermoplastic resin, and a thermosetting resin. Examples of an elastomer include a urethane rubber, a silicone rubber, a fluorine rubber, a synthetic rubber, and so on. Examples of a thermoplastic resin include polyethylene, polypropylene, polyvinyl chloride, an acrylic resin, and so on. Examples of a thermosetting resin include a phenol resin, an epoxy resin, and so on.

The core wire exposed portions 12*a* (in this example, the junction portion 16 and end portions of the coatings 14 close to the junction portion 16) are housed in the above-described internal cap 22. The water-blocking agent 26 has been filled into the internal cap 22 and has been cured. In the internal cap 22, the water-blocking agent 26 is cured in a state of filling a gap between the core wire exposed portions 12*a* and the inner circumferential surface of the internal cap 22, more specifically a gap between the junction portion 16 and the inner circumferential surface of the internal cap 22 and between end portions of the coatings 14 close to the junction portion 16 and the inner circumferential surface of the internal cap 22.

A liquid water-blocking agent that contains a main agent and a curing agent is injected as the water-blocking agent 26 into the internal cap 22 in which the core wire exposed portions 12*a* are housed, and is cured in the internal cap 22. An epoxy-based resin, an acrylic-based resin, or the like may be used as the water-blocking agent 26. The water-blocking agent 26 of various curing types, such as a two-component curing type, a moisture curing type, a light curing type, and so on, may be used. An agent into which a rubber-based modifier such as PBA (polybutyl acrylate) is mixed, or an impact resistant resin such as PMMA (polymethyl methacrylate) may be used as the water-blocking agent 26. However, as described below, in the waterproofing structure 20, the influence of external heat is alleviated by a space S. Therefore, it is possible to prevent a resin crack without using a particular resin focusing on crack prevention as described above, which contributes to cost reduction.

A cured liquid surface 26F of the water-blocking agent 26 in the internal cap 22 may be located on the bottom side relative to the opening edge of the internal cap 22 (see FIG. 3). In a state where the water-blocking agent 26 in liquid form is filled into the internal cap 22, the cured liquid surface 26F corresponds to the liquid surface of the water-blocking agent 26 in liquid form, and the cured liquid surface 26F is formed as a result of the water-blocking agent 26 in liquid form being thereafter cured. The cured liquid surface 26F is preferably located above the core wire exposed portions 12*a* and on the bottom side relative to the opening edge of the internal cap 22. For example, the total length L1 of the internal cap 22 may be 40 mm, and a distance L2 from the bottom of the internal cap 22 to the cured liquid surface 26F may be 30 mm to 35 mm (see FIG. 3).

In the internal cap 22, the leading end of the core wire exposed portions 12*a* (the junction portion 16) may be in contact with the bottom of the internal cap 22, or may be located at a distance from the bottom.

Although the present embodiment describes an example in which the internal waterproofing portion 21 includes the internal cap 22 and the water-blocking agent 26, the internal waterproofing portion 21 does not necessarily have such a configuration.

For example, the internal waterproof portion 21 may be a molded resin formed so as to cover the core wire exposed portions 12*a* (the junction portion 16). Also, the internal waterproofing portion 21 may be configured such that the core wire exposed portions 12*a* (the junction portion 16) are covered by a heat shrinkable tube in which a water-blocking agent such as a hot-melt adhesive is provided, and the gap between the heat shrinkable tube and the core wire exposed portions 12*a* (the junction portion 16) is filled with the water-blocking agent while the heat shrinkable tube is thermally shrunk. The internal waterproofing portion 21 may be configured to cover the core wire exposed portions 12*a* (the junction portion 16) in a state of being in direct contact with the core wire exposed portions 12*a* (junction portion 16).

The exterior member 30 is a member that forms a space S that is separated from the external space, around the internal waterproofing portion 21. The space S formed by the exterior member 30 need only be separated such that the air in the external space does not easily flow into the space S, and need not be completely separated such that no air leakage occur. The space S may be a space filled with air, or a space with reduced pressure.

In this example, the exterior member 30 is a member that encloses the inner circumferential surface of the internal waterproofing portion 21 with a gap from the outer circumferential surface of the exterior member 30, and forms the space S that has a tubular shape on the outer circumference side of the internal waterproofing portion 21. In this example, the space S is formed between the inner bottom of the exterior member 30 and the bottom of the internal cap 22. That is, the space S includes a tubular portion around the internal waterproofing portion 21 and a portion that continues downward from the tubular portion and expands outward of the bottom of the internal waterproofing portion 21, and thus the space S has a bottomed tubular shape overall.

More specifically, the exterior member 30 includes an external cap 32 that has a tubular shape with one end open and the other end closed. The external cap 32 is a member that encloses the outer circumferential surface of the internal cap 22 with a gap from the outer circumferential surface. That is, the external cap 32 is larger than the internal cap 22, and the space S can be formed between the internal cap 22 and the external cap 32 in a state where the internal cap 22 is provided inside the external cap 32.

More specifically, an intermediate portion of the external cap 32 in an extending direction in which the external cap 32 extends has a spindle shape, of which the thickness gradually increases in a direction from the two ends to an intermediate position of the external cap 32 in the extending direction. For example, a length L4 of the external cap 32 may be 60 mm, and a portion where a distance L3 from the opening edge of one end of the external cap 32 is 30 mm, i.e.

the central portion of the external cap 32 in the extending direction, may be formed as the thickest portion.

An inner diameter φ2 of the thickest portion in the intermediate portion of the external cap 32 in the extending direction is greater than an outer diameter φ1 of the internal cap 22. For example, the inner diameter φ2 is equal to or greater than the sum of the outer diameter φ1 and 2 mm. For example, the outer diameter φ1 of the internal cap 22 may be 8 mm, and the inner diameter φ2 of the thickest portion of the external cap 32 may be 10 mm Therefore, in a state where the internal cap 22 is housed in the external cap 32, the space S between the outer circumferential surface of the internal cap 22 and the inner circumferential surface of the external cap 32 includes a portion where an interval t1 is greater than or equal to 1 mm. The upper limit of the interval t1 of the space S around the internal cap 22 may be smaller than or equal to 10 mm, for example.

An opening-side end portion 33 at one end of the external cap 32 includes a portion where the inner diameter is φ3, which is smaller than the inner diameter of a portion enclosing the core wire exposed portions 12*a* (the junction portion 16). In this example, the intermediate portion of the external cap 32 in the extending direction has a spindle shape, of which the thickness gradually decreases in directions towards both sides of the thickest portion where the inner diameter φ2 is 10 mm, and the opening-side end portion 33 is formed continuously from the spindle-shaped portion. The opening-side end portion 33 has a shape that includes a plurality of ring-shaped protrusions 33*p* that protrude toward the inner circumference side. More specifically, the opening-side end portion 33 has a tubular shape, and the plurality of ring-shaped protrusions 33*p* are formed as a result of ring-shaped narrowed portions that are narrowed in the direction from the outer circumference side to the inner circumference side being formed at intervals in the extending direction of the opening-side end portion 33. The ring-shaped protrusions 33*p* each protrude toward the inner circumference side compared to portions adjacent thereto in the extending direction of the opening-side end portion 33, so as to have a ring shape. The ring-shaped protrusions 33*p* are portions where the inner diameter is φ3, which is smaller than the inner diameter of the portion enclosing the core wire exposed portions 12*a* (the junction portion 16). For example, when the above-described inner diameter φ2 is 10 mm, the inner diameter φ3 of the ring-shaped protrusions 33*p* may be 8 mm.

If this is the case, as a result of the internal cap 22 being housed in the external cap 32 such that the opening-side end portion of the internal cap 22 is located inside the opening-side end portion 33 of the external cap 32, the portion of the internal cap 22 enclosing the core wire exposed portions 12*a* (the junction portion 16) is located in the intermediate portion of the external cap 32 in the extending direction. In this state, the ring-shaped space S is formed between the outer circumferential surface of the portion of the internal cap 22 enclosing the core wire exposed portions 12*a* (the junction portion 16) and the inner circumferential surface of the external cap 32, with a substantially constant interval between the circumferential surfaces. Therefore, it is easy to secure the space S along the entire circumference of the internal cap 22.

In order to stably position the portion of the internal cap 22 enclosing the core wire exposed portions 12*a* (the junction portion 16) at a position in the intermediate portion of the external cap 32 in the extending direction, it is preferable that the opening edge of the external cap 32 is aligned with the opening edge of the internal cap 22 (see FIG. 4).

Also, in the opening-side end portion 33 of the external cap 32, ring-shaped recessed portions 33*q* are formed adjacent to the ring-shaped protrusions 33*p* so as to be recessed in a ring shape when seen from the inner circumference side. The inner circumferential surfaces of the ring-shaped recessed portions 33*q* are located at a distance from the outer circumferential surface of the opening-side end portion of the internal cap 22. Therefore, in a state where the internal cap 22 is located inside the external cap 32, ring-shaped spaces T are each defined by the outer circumferential surface of the opening-side end portion of the internal cap 22, the inner circumferential surface of a ring-shaped recessed portion 33*q*, and two ring-shaped protrusions 33*p* (see FIG. 4).

The other end of the external cap 32 has an elongated hemispherical shape that bulges outward. It is preferable that the length L4 of the external cap 32 is greater than the length L1 of the internal cap 22 so that a distance is secured between a leading end of the internal cap 22 and the leading end of the external cap 32. For example, when the length L1 of the internal cap 22 is 40 mm, the length L4 of the external cap 32 may be 60 mm.

Of course, it is possible to employ a configuration in which the space S is formed around the internal cap 22 and no space is formed at the leading end of the internal cap 22. If this is the case, the leading end portion of the internal cap 22 may be in contact with the inner surface of the leading end of the external cap 32.

It is preferable that a thickness t2 of the external cap 32 is large enough to keep the shape of the external cap 32 constant, and, for example, the thickness t2 of the external cap 32 may be no less than 1 mm. The thickness t2 of the external cap 32 may be no greater than 5 mm.

The external cap 32 may be formed through dip molding, or through injection molding.

The external cap 32 does not necessarily have the above-described shape. The intermediate portion of the external cap 32 in the extending direction may have a cylindrical shape with a constant inner diameter. Also, the intermediate portion of the external cap in the extending direction does not necessarily have a cylindrical shape, and may have an elliptic tube shape, or a polygonal tube shape such as a triangular tube shape or a square tube shape.

The external cap 32 is made of at least one of an elastomer, a thermoplastic resin, and a thermosetting resin. Examples of an elastomer include a urethane rubber, a silicone rubber, a fluorine rubber, a synthetic rubber, and so on. Examples of a thermoplastic resin include polyethylene, polypropylene, polyvinyl chloride, an acrylic resin, and so on. Examples of a thermosetting resin include a phenol resin, an epoxy resin, and so on.

In a state where the internal waterproofing portion 21 is housed in the external cap 32, the external cap 32 is fixed to the internal waterproofing portion 21 or the electrical wires 10. In this example, in a state where the opening side edge of the external cap 32 is aligned with the opening side edge of the internal cap 22, a piece of adhesive tape 40 is wound around a portion extending from the opening-side end portion 33 of the external cap 32 to the electrical wires 10 extending from the opening-side end portion 33 (in this example, a bundle of electrical wires 10), and thus the external cap 32 is fixed to the electrical wires 10. Note that the opening in the internal cap 22 is closed by the piece of adhesive tape 40, and therefore a space separated from the external space is also formed above the cured liquid surface 26F in the internal cap 22. In this way, it is possible to manufacture the waterproofing structure 20 by installing the external cap 32 around the internal waterproofing portion 21, and therefore it is possible to obtain the waterproofing structure 20 with excellent workability at low cost.

The configuration for installing the external cap 32 is not limited to the above-described example. For example, if the opening-side end portion of the internal cap 22 extends from the opening of the external cap 32, a piece of adhesive tape may be wound around a portion extending from the opening-side end portion 33 of the external cap 32 to the opening-side end portion of the internal cap 22 extending from the opening-side end portion 33, and thus the external cap 32 may be fixed to the internal cap 22.

Alternatively, the opening-side end portion 33 of the external cap 32 may be squeezed with a cable tie or the like, and thus the external cap 32 may be fixed to the electrical wires 10 inside or the internal cap 22. It is also possible to use an adhesive or the like to fix the external cap 32 to the electrical wires 10 or the internal cap 22. Also, a fitting portion that can be fitted into the opening-side end portion 33 of the external cap 32 may be formed at ends of the coatings 14 of the electrical wires 10 or the opening-side end portion of the internal waterproofing portion 21, and the opening-side end portion 33 of the external cap 32 may be fitted onto the fitting portion.

The following describes an example of a method for manufacturing the waterproofing structure 20 for a core wire exposed portion of an electrical wire.

First, as shown in FIG. 2, an electrical wire 10 including a core wire exposed portion 12a is prepared. In this example, a plurality of electrical wires 10, in which core wire exposed portions 12a are joined to each other to form a junction portion 16, are prepared. Thereafter, the junction portion 16 and the end portions of the coatings 14 that are continuous with the junction portion 16 are placed into the internal cap 22. Before or after this stage, a liquid water-blocking agent 26B is injected into the internal cap 22 from a nozzle 26N or the like. At this time, it is preferable that a certain amount of water-blocking agent 26B is injected such that the liquid surface of the liquid water-blocking agent 26B will be located on the bottom side relative to the opening side edge of the internal cap 22. Thereafter, the liquid water-blocking agent 26B is cured. As a result, the cured water-blocking agent 26 is formed in the internal cap 22, and the internal waterproofing portion 21 is formed around end portions of the electrical wires.

Next, as shown in FIGS. 3 and 4, the internal waterproofing portion 21 is placed into the external cap 32. At this time, the opening side edge of the internal cap 22 and the opening side edge of the external cap 32 are aligned with each other such that the opening-side end portion of the internal cap 22 is located within the opening-side end portion 33 of the external cap 32. As a result, the ring-shaped protrusions 33p abut against the outer circumferential surface of the opening-side end portion of the internal cap 22. The ring-shaped protrusions 33p protrude toward the inner circumference side compared to the intermediate portion of the external cap 32 in the extending direction. Therefore, in the intermediate portion of the external cap 32 in the extending direction, the inner circumferential surface of the intermediate portion of the external cap 32 in the extending direction and the outer circumferential surface of the internal cap 22 can be separated from each other by a distance that is approximately the same as the protruding length of the ring-shaped protrusions 33p. As a result, the ring-shaped space S can be formed around the internal cap 22. Also, the internal cap 22 is away from the leading end portion of the external cap 32, and therefore the space S can also be formed on the leading end side of the internal cap 22.

Thereafter, the external cap 32 is fixed to the internal cap 22 or the electrical wires 10 using a piece of adhesive tape 40 or the like. Thus, the waterproofing structure 20 for core wire exposed portions of electrical wires can be manufactured.

According to the present embodiment, due to the exterior member 30, the space S that is separated from the external space is formed around the internal waterproofing portion 21. Therefore, changes in the ambient temperature are less likely to be transferred to the internal waterproofing portion 21, and it is possible to prevent cracking from occurring in the internal waterproof portion, even under an excessively cold or hot environment, or the like Here, a phenomenon in which cracking occurs in the internal waterproofing portion 21 around the core wire exposed portions 12a or around end portions of the coatings 14, and external water enters into the core wire exposed portions 12a through the crack can be conceived of as an issue concerning waterproofing of the core wire exposed portions 12a. According to the present embodiment, the temperature of the internal waterproofing portion 21 is less likely to change, and cracking is less likely to occur in the internal waterproofing portion 21, specifically in the water-blocking agent 26, for example, due to linear expansion or the like. Thus, it is more likely that waterproofing properties can be maintained.

Note that, regarding the core wire exposed portions 12a, there also is an issue concerning water blocking. The issue concerning water blocking includes an issue concerning the travelling of water between the electrical wires 10, in addition to the issue concerning the above-described waterproofing (entrance of external water). That is, in a case where the core wire exposed portions 12a of a plurality of electrical wires 10 are joined to each other, water that has entered into one electrical wire 10 may travel to another electrical wire 10 via another junction portion 16, and there is a demand to block such water as well. Usually, the water-blocking agent 26 is cured in a state of filling the gaps between the strands in the core wire exposed portions 12a, and thus the travelling of water between the electrical wires is likely to be blocked. However, if cracking occurs in the water-blocking agent 26 between the strands due to linear expansion or the like, such water blocking properties regarding water travelling between electrical wires will be impaired. According to the present embodiment, the temperature of the internal waterproofing portion 21 is less likely to change, and cracking is prevented from occurring in the water-blocking agent 26 between the strands due to linear expansion or the like. Thus, it is more likely that water blocking properties can also be maintained.

Also, the exterior member 30 encloses the outer circumferential surface of the internal waterproofing portion 21 with a gap from the inner circumferential surface of the exterior member 30, and forms the space S that has a tubular shape on the outer circumference side of the internal waterproofing portion 21. Therefore, regarding the entire circumference of the internal waterproofing portion 21, external heat is less likely to be transferred to the internal waterproofing portion 21, and cracking can be effectively prevented from occurring in the internal waterproofing portion 21.

Also, if the space S formed around the internal waterproofing portion 21 includes a portion that secures a distance of 1 mm or more, external heat is less likely to be transferred to the internal waterproofing portion 21, and cracking can be effectively prevented from occurring in the internal waterproofing portion 21.

Also, if the thickness t2 of the exterior member 30 is 1 mm or more, the exterior member 30 is less likely to deform due to heat or the like, and the space S can be easily secured between the internal waterproofing portion 21 and the exterior member 30. Therefore, it is easier to keep the internal waterproofing portion 21 in a state where external heat is less likely to be transferred thereto, and it is possible to effectively prevent cracking from occurring in the internal waterproofing portion 21. Especially, in a case where the external cap 32 is made of at least one of an elastomer, a thermoplastic resin, and a thermosetting resin, it is preferable that the thickness t2 of the exterior member 30 is greater than or equal to 1 mm, in order to prevent the exterior member 30 from deforming.

Also, if the exterior member 30 is made of at least one of an elastomer, a thermoplastic resin, and a thermosetting resin, it is easy to form the exterior member 30. Note that the exterior member 30 need only provide the space S around the internal waterproofing portion 21, and from this point of view, the material of the exterior member 30 is not specifically limited.

Also, the internal waterproofing portion 21 can be waterproofed by the internal cap 22 in which the core wire exposed portions 12a are housed, and by the water-blocking agent 26 filled into the internal cap 22 and cured. A conventional configuration may also be used as such a configuration.

Also, the cured liquid surface 26F of the water-blocking agent 26 in the internal cap 22 is located on the bottom side relative to the opening edge of the internal cap 22, and therefore a space for preventing heat from being transferred can also be easily secured above the cured liquid surface 26F in the internal cap 22. As a result, it is possible to effectively prevent cracking from occurring in the internal waterproofing portion 21.

Also, the exterior member 30 includes the external cap 32 that encloses the outer circumferential surface of the internal cap 22 with a gap from the outer circumferential surface, and therefore the external cap 32 can provide the space S around the internal cap 22. Also, such an external cap 32 can be formed by enlarging the internal cap 22. Therefore, facility for forming the internal cap 22 can also be used, and the external cap 32 can be easily manufactured.

Also, the opening-side end portion 33 of the external cap 32 includes a portion where the inner diameter is φ3, which is smaller than the inner diameter of the intermediate portion in the extending direction that encloses the core wire exposed portions 12a. Therefore, the space S can be easily secured around the portion of the internal cap 22 that encloses the core wire exposed portions 12a.

Also, the inner diameter φ3 of the opening-side end portion 33 is an inner diameter with which the opening-side end portion of the internal cap 22 can be fitted into the opening-side end portion 33 in a stable state. In this example, the inner diameter φ3 of the opening-side end portion 33 is equal to the outer diameter φ1 of the internal cap 22. Therefore, the opening-side end portion of the internal cap 22 can be inserted into, and held at, the opening-side end portion 33 of the external cap 32 in a stable state, and the space S can be stably secured around the internal cap 22.

Also, the opening-side end portion 33 of the external cap 32 is formed so as to have a shape that includes the plurality of ring-shaped protrusions 33p that protrude toward the inner circumference side. Therefore, it is possible to form spaces between the plurality of ring-shaped protrusions 33p, and the presence of such spaces makes external heat less likely to be transferred to the core wire exposed portions 12a.

Due to the plurality of ring-shaped protrusions 33p, it is easier to stably keep the opening-side end portion of the internal cap 22 in the same orientation.

Also, the opening edge of the external cap 32 is aligned with the opening edge of the internal cap 22. Therefore, it is possible to stably align the external cap 32 and the internal cap 22 in the extending direction of the external cap 32, and it is easy to stably secure a space on the leading end side of the internal cap 22.

Such a waterproofing structure 20 for core wire exposed portions of electrical wires can be used in various modes in, for example, a portion that may get wet in vehicles, ships, aircrafts, mechanical devices, and so on. For example, a portion near an engine of an automobile is near a heat source and may get wet. If a plurality of sensors are provided in such a portion and ground circuits or the like are connected in parallel, it is possible to realize a configuration in which the ground circuits are connected to the ground portion all at once, using the waterproofing structure 20 for core wire exposed portions of electrical wires. Therefore, the waterproofing structure 20 makes work easier when wires of devices or the like are to be connected.

Actually, samples were created using a bisphenol A epoxy resin as the water-blocking agent 26, and a thermal shock test was carried out using a testing apparatus with a temperature recovery time of five minutes or less.

In the thermal shock test, the samples were subjected to 1000 cycles in each of which the samples were exposed to a −40° C. environment for 30 minutes and to a 120° C. environment for 30 minutes. The samples that underwent such thermal environments were subjected to a test regarding whether or not air leakage occurs when an air pressure of 200 hPa is applied to the electrical wires 10, a test regarding whether or not an insulation performance of no less than 100 MΩ is ensured between the core wire exposed portions 12a and the outside, and a test regarding whether or not the value of a leak current exceeds 100 µA when a predetermined voltage is applied.

A sample in which the internal waterproofing portion 21 is formed at ends of the electrical wires 10, but the above-described exterior member 30 is not provided, and that would not pass the above tests, was prepared as a sample A.

A sample in which the exterior member 30 is provided in the above sample A was prepared as a sample B. Note that the sizes of the parts constituting the samples are set to be the examples of values or to be within the examples of ranges indicated in the above-described embodiment.

Under such conditions, it was confirmed that the sample B created by providing the sample A, which would not pass the above tests, with the exterior member 30 passed the tests.

This result shows that the space S provided using the exterior member 30 improves waterproofing properties.

Also, a sample C was prepared, in which bisphenol A epoxy resin is used as the water-blocking agent 26, and the interval t1, which is the maximum interval in the space around the internal waterproofing portion 21, is 1 mm. The time required for the temperature of the sample C to drop to 40° C. was measured under a condition where this sample C was heated at a high temperature of 130° C., was taken out when the temperature of the sample C became saturated at 130° C., and was rapidly cooled with water at 10° C.

In this case, it was found that the time required for the temperature to drop to 40° C. is no less than twice the time the time required for the temperature of a sample without the exterior member 30 to drop to 40° C. under the same condition. Thus, it is apparent that changes in temperature can be effectively suppressed when the interval t1 of the space S is no less than 1 mm Modifications The following describes various modifications.

In the above-described embodiment, the external cap 32 is made of at least one of an elastomer, a thermoplastic resin, and a thermosetting resin. However, the material of the external cap 32 is not specifically limited.

Figure 5:
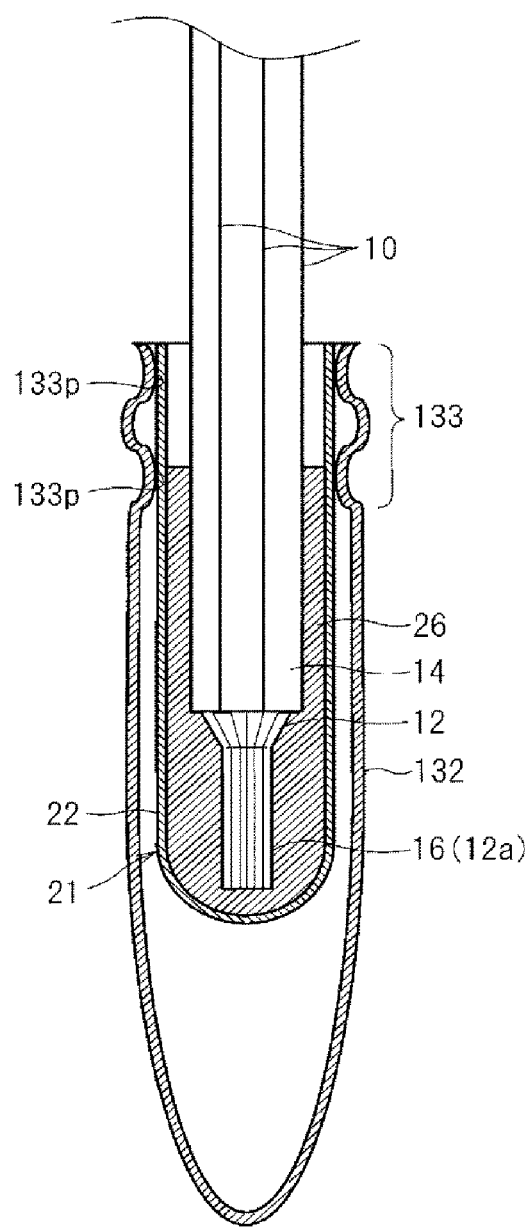
FIG. 5 is a partial cross-sectional view showing a waterproofing structure for core wire exposed portions of electrical wires according to a first modification.

For example, as in a first modification shown in FIG. 5, the exterior member 30 may include an external cap 132 that is made of metal. Examples of metal that can be used include aluminum, an aluminum alloy, iron, stainless steel, and so on. Also, an opening-side end portion 133 of the external cap 132 made of metal may be swaged to the internal cap 22 or the electrical wires 10 (a bundle of electrical wires 10) by being plastically deformed toward the internal cap 22 or the electrical wires 10 (a bundle of electrical wires 10). It is preferable that swaging deformation is made at a plurality of positions in the extending direction of the opening-side end portion 133, and ring-shaped protrusions 133p that are similar to the above-described ring-shaped protrusions 33p are formed. Of course, as in the above-described embodiment, the external cap 132 may be fixed using a piece of adhesive tape or the like. It is also possible to use an adhesive or the like to fix the external cap 132 to the electrical wires 10 or the internal cap 22. Also, a fitting portion that can be fitted into the opening-side end portion 33 of the external cap 132 may be formed at ends of the coatings 14 of the electrical wires 10 or the opening-side end portion of the internal waterproofing portion 21, and the opening-side end portion 133 of the external cap 32 may be fitted onto the fitting portion.

According to the first modification, the external cap 132 made of metal can reflect radiant heat, and changes in the temperature of the internal waterproofing portion 21 caused by radiant heat can be suppressed. Also from this point of view, it is possible to prevent cracking from occurring in the internal waterproofing portion 21.

In the embodiment and the modifications, the internal cap 22 is placed inside the external cap 32 and the space S is formed between the internal cap 22 and the external cap 32. Such a space S is not necessarily formed between the internal cap 22 and the external cap 32.

For example, the internal waterproofing portion 21 may be enclosed by a member that has an internal space that is separated from the external space.

A space enclosing member that has an internal space that is separated from the external space may be used as such a member. For example, a foam member such as a foamed resin, a foamed buffer member in which air is enclosed between two resin sheets or the like, or a fabric assembly member (a nonwoven fabric, a woven fabric, or the like) formed of an assembly of fabrics may be used as the space enclosing member. The foam member may be regarded as a member that encloses a plurality of spaces that are separated from the external space. The foamed buffer member may also be regarded as a member that encloses a plurality of spaces that are separated from the external space. In the fabric assembly member, air in the spaces between fabrics is less likely to be exchanged with the external air. Therefore, the fabric assembly member can be regarded as a member in which spaces that are separated from the external space are enclosed between fabrics.

Therefore, by enclosing the internal waterproofing portion 21 with the above-described space enclosing member, it is possible to form space that is separated from the external space, around the internal waterproofing portion 21.

Figure 6:
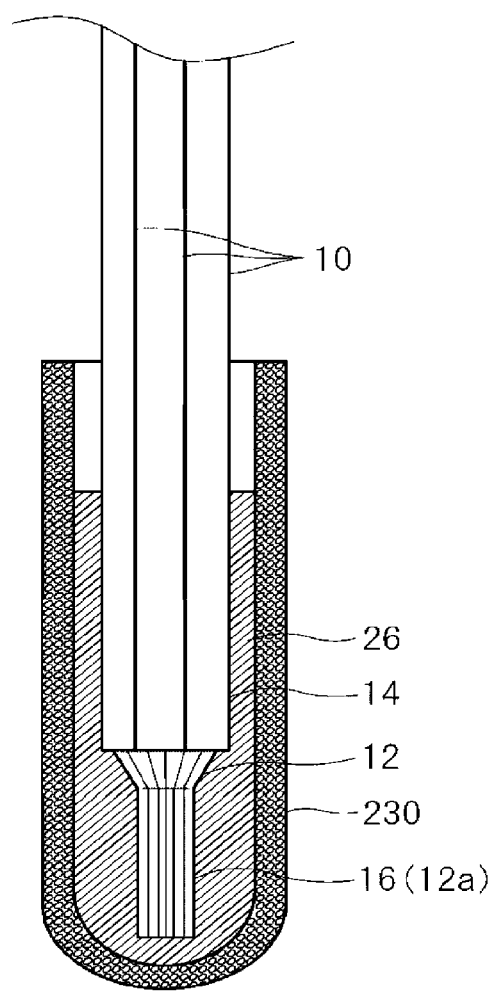
FIG. 6 is a partial cross-sectional view showing a waterproofing structure for core wire exposed portions of electrical wires according to a second modification.

As in a second modification shown in FIG. 6, a space enclosing member 230 may be formed so as to have a bottomed tubular shape with one end open and the other end closed, through molding, heat compression molding, heat bonding, sewing, and so on, and the internal cap 22 may be housed in the space enclosing member 230. If the space enclosing member 230 is formed so as to have a bottomed tubular shape, the space enclosing member 230 may be in contact with the outer circumferential surface of the internal waterproofing portion 21 without a gap. A gap may be formed between the space enclosing member and the internal waterproofing portion 21. The space enclosing member 230 may be different from the above-described external cap 32 in that the space enclosing member 230 is not necessarily made of a material that is hard enough to enable the space enclosing member 230 to maintain the shape thereof so that the space S can be formed.

Figure 7:
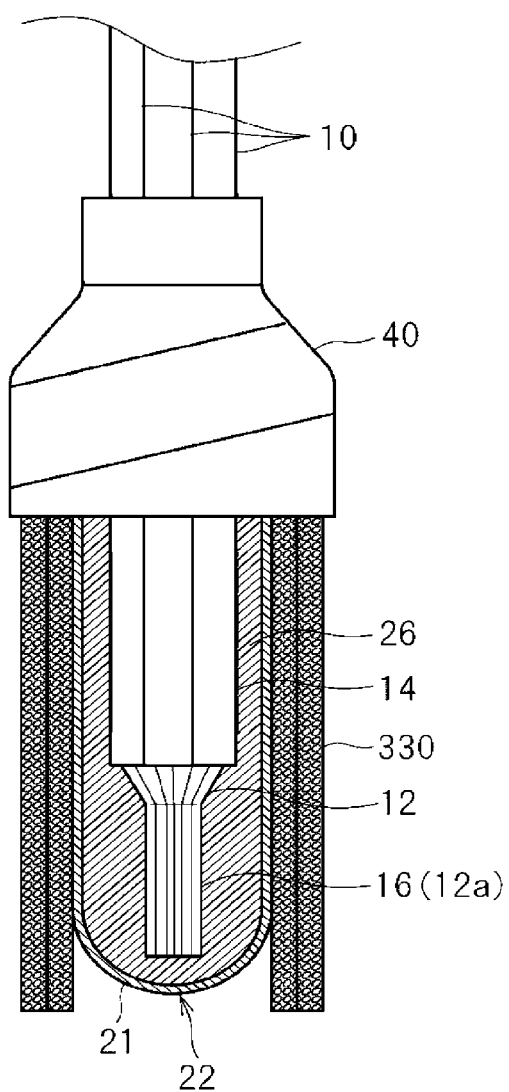
FIG. 7 is a partial cross-sectional view showing a waterproofing structure for core wire exposed portions of electrical wires according to a third modification.

Also, as in a third modification shown in FIG. 7, a space enclosing member 330 may be formed so as to have a sheet shape or a band shape, wound around the internal waterproofing portion 21, and maintained in the wound state, using a piece of double-sided tape, an adhesive, a piece of adhesive tape, or the like (FIG. 7 shows a piece of adhesive tape 40). The space enclosing member 330 may be configured to enclose the internal waterproofing portion 21, but not enclose a leading end side portion thereof, or enclose both the internal waterproofing portion 21 and the leading end side portion.

In the above-described embodiment and modifications, the core wire exposed portions 12a are formed at ends of the electrical wires 10, and the waterproofing structure for the core wire exposed portions 12a at the ends are described. However, the configuration described in the above embodiment and so on is also applicable to a structure for waterproofing the core wire exposed portions 12a when the core wire exposed portions 12a are formed in intermediate portions of the electrical wires in the extending direction. For example, the core wire exposed portions in the intermediate portions of the electrical wires in the extending direction may be configured as an internal waterproof portion enclosed with resin such as a photosetting resin or a thermosetting resin, a heat shrinkable tube, or the like, and an exterior member may be provided to form a space that is separated from the external space, around the internal waterproof portion. A tube member that is narrower at the two ends than in the intermediate portion may be used as the exterior member. It is possible to employ a configuration in which a piece of adhesive tape is wound around the two ends of the tube member and the electrical wires so that a space is provided between the tube member and the internal waterproofing portion, a configuration in which a foamed sheet or a piece of foamed tape is wound, and so on.

Note that the configurations described in the above embodiment and modifications may be combined with each other as appropriate as long as they do not contradict each other. For example, a foamed resin or the like maybe provided inside a metal cap.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A waterproofing structure for a core wire, the waterproofing structure comprising:
    an electrical wire that includes the core wire having an exposed portion provided at an end of the electrical wire;
    an internal waterproofing member that encloses the core wire having the exposed portion to waterproof the exposed portion of the core wire, the internal waterproofing member including an internal cap that houses the exposed portion of the core wire, and a water-blocking agent that has been filled into the internal cap and has been cured; and
    an exterior member provided to surround the internal waterproofing member to form a space between the internal waterproofing member and the exterior member thereby separating the space, the exterior member including an external cap that encloses an outer circumferential surface of the internal cap with a gap from the outer circumferential surface,
    wherein an opening side end portion of the external cap includes a portion that has an inner diameter smaller than an inner diameter of a portion that encloses the exposed portion of the core wire.

2. The waterproofing structure according to claim 1, wherein the exterior member encloses an outer circumferential surface of the internal waterproofing member with a gap from the outer circumferential surface, to form a tubular space on the outer circumference side of the internal waterproofing member.

3. The waterproofing structure according to claim 2, wherein the space includes a portion where an interval is greater than or equal to 1 mm.

4. The waterproofing structure according to claim 1, wherein the exterior member has a thickness greater than or equal to 1 mm.

5. The waterproofing structure according to claim 1, wherein the exterior member is made of at least one of an elastomer, a thermoplastic resin, and a thermosetting resin.

6. The waterproofing structure according to claim 1, wherein the exterior member is made of metal.

7. The waterproofing structure according to claim 1, wherein a cured liquid surface of the water-blocking agent is located on the bottom side relative to an opening edge of the internal cap.

8. The waterproofing structure according to claim 1, wherein the opening side end portion of the external cap has a shape that includes a plurality of ring-shaped protrusions that protrude toward an inner circumference side of the external cap.

9. The waterproofing structure according to claim 1, wherein an opening edge of the external cap is aligned with an opening edge of the internal cap.

* * * * *